United States Patent

Berg

Patent Number: 5,824,948
Date of Patent: Oct. 20, 1998

[54] SAFETY SHIELD

[76] Inventor: Gordon Berg, 293 Moreland Cir., West St. Paul, Minn. 55118

[21] Appl. No.: 717,461

[22] Filed: Sep. 20, 1996

Related U.S. Application Data

[60] Provisional application No. 60/007,353 Nov. 20, 1995.

[51] Int. Cl.⁶ ...................................................... H02B 1/14
[52] U.S. Cl. .............................................................. 174/5 R
[58] Field of Search ........................ 174/5 R, 66, 138 F, 174/53

[56] References Cited

U.S. PATENT DOCUMENTS

| | | | |
|---|---|---|---|
| 3,112,973 | 12/1963 | Von Holtz | 339/14 |
| 3,299,199 | 1/1967 | Mattingly | 174/50 |
| 3,371,149 | 2/1968 | Maxted | 174/53 |
| 3,437,738 | 4/1969 | Wagner . | |
| 3,684,819 | 8/1972 | Wilson . | |
| 3,716,651 | 2/1973 | Werner . | |
| 4,295,018 | 10/1981 | Borrelli . | |
| 4,588,851 | 5/1986 | Turner | 174/5 R |
| 4,674,807 | 6/1987 | Boteler et al. . | |
| 4,794,485 | 12/1988 | Bennett . | |
| 4,847,444 | 7/1989 | Holland . | |
| 4,958,048 | 9/1990 | Bell . | |
| 4,972,045 | 11/1990 | Primeau | 174/66 |
| 4,983,785 | 1/1991 | Johnston . | |
| 4,998,102 | 3/1991 | Wyler et al. | 340/870.02 |
| 5,347,684 | 9/1994 | Jackson | 16/111 R |

*Primary Examiner*—Bot L. Ledynh
*Assistant Examiner*—Joseph Waks
*Attorney, Agent, or Firm*—Jacobson & Johnson

[57] ABSTRACT

A safety shield to prevent an accidental shorting of an electrical device if the electrical device is removed or inserted into a junction box during a power on condition with the shield removably fastened to the electrical device and having an electrically insulating material extending over exposed electrical leads on the electrical device to prevent accidental contact between the electrical leads and the grounded junction box.

7 Claims, 1 Drawing Sheet

SAFETY SHIELD

This application claims the benefit of U.S. Provisional Application No. 60/007,353 filed on Nov. 20, 1995.

FIELD OF THE INVENTION

This invention relates generally to safety shields and more specifically to electrical safety shields to prevent an electrical short circuit when removing or inserting an electrical device such as a switch or receptacle in an electrical junction box.

BACKGROUND OF THE INVENTION

One of the hazards electricians encounter is that they often have to make changes or connections to live electrical devices such as switches or outlets that are located in junction boxes. Often times the electrical devices are connected to live wires that carry hundreds of volts of electricity. In addition the junction boxes are often very crowded so that when the electrician works on the electrical outlet, a minor displacement or the outlet during removal or insertion can cause a short circuit. The present invention provides an insulating shield that can be placed over the exposed terminals on an electrical device to prevent the terminals from accidently coming into contact with the electrician or the junction box as the electrical device is removed or inserted into the junction box.

SUMMARY OF THE INVENTION

Briefly the invention comprises a safety shield to prevent an accidental shorting of an electrical device if the electrical device is removed or inserted in an electrical junction box during a power on condition with the shield extending over a portion of the electrical device with the shield comprising an electrically insulating material extending over exposed electrical connections to prevent accidental contact between the electrical leads and a ground.

DESCRIPTION OF THE PREFERRED EMBODIMENT

Figure 1:
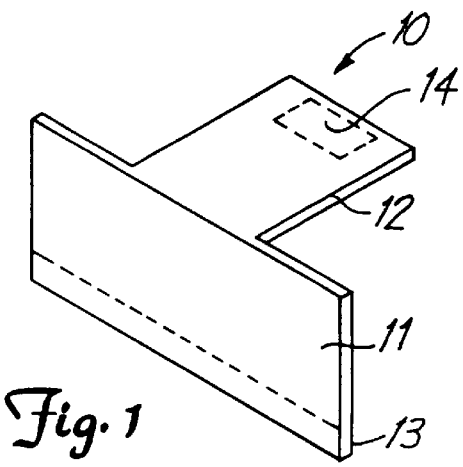
FIG. 1 shows a perspective view of the insulting shield of the present invention.

FIG. 1 shows a perspective view of an electrical insulation shield 10 for securing to an electrical device to prevent an accidental shorting of the electrical device if the electrical device is removed or inserted into a junction box in a power on condition. The shield 10 comprises an electrically insulating transparent material such as plastic or the like. Shield 10 includes a first region 11 with an elongated strip of adhesive 13 thereon to secure the first region to an electrical device in a position where the electrical insulating material extends over the portion of the electrical device containing the exposed electrical connections. The shield 10 includes a second region 12 with an adhesive 14 thereon to secure the second region to the electrically insulating device to enable the electrically insulating device to be held over exposed electrical leads and a junction box to prevent accidental contact between the electrical leads and a junction box.

Suitable electrical insulating material can be used and preferably a flexible insulating material can be used to facilitate forming the shield around different types of electrical devices. The use of a transparent material allows the electrician to see what type of connections are covered by the shield without having to remove the shield. The shield should have sufficient thickness to withstand handling without tearing. In most instances a shield of 1/16 of an inch or less in thickness is sufficient to cover exposed terminals and prevent electrical shorts and not interfere with the normal positioning of the electrical shield.

Figure 2:
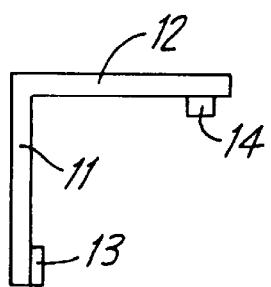
FIG. 2 shows a side view of the insulating shield of the present invention.

FIG. 2 shows a side view of insulating shield 10 with the adhesive members 13 and 14 securing the shield 10 to the electrical device. While adhesive members are shown, it is envisioned that other means for fastening or securing the shield to an electrical device can be used.

Figure 3:
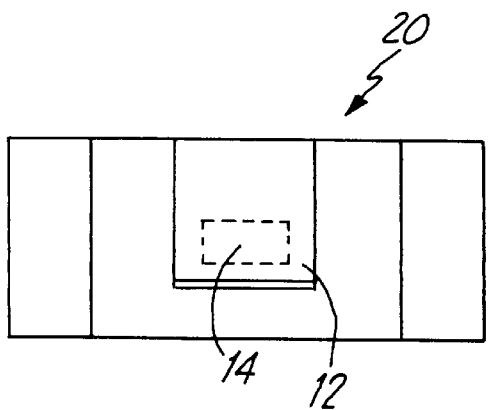
FIG. 3 shows a side view of an electrical switch with the insulating shield of the present invention.

FIG. 3 shows an electrical device comprising a switch 20 with a toggle member 21. A support member 22 extends from switch 20. A first set of live electrical wires 23 is connected to electrical switch 20 through a screw 24 and similarly a second electrical wire 25 is connected to the opposite side of switch 20 through a screw 26. FIG. 3 shows transparent shield 10 with a first member 11 extending over terminals 24 and 26 and secured to the switch by an adhesive 13.

Figure 4:
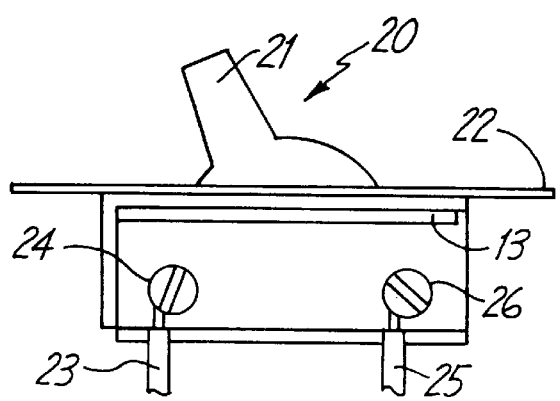
FIG. 4 shows a bottom view of the electrical switch and the insulating shield of FIG. 3.

FIG. 4 shows a bottom view of switch with member 12 extending onto the bottom of switch 20 and held in position by adhesive 14. Thus, in the present invention the shield is held on two adjacent surfaces by an adhesive with the shield covering the exposed electrical leads. The use of the shield on only two surfaces minimizes the congestion that occurs in electrical junction boxes while still providing protection to the electrician.

Figure 5:
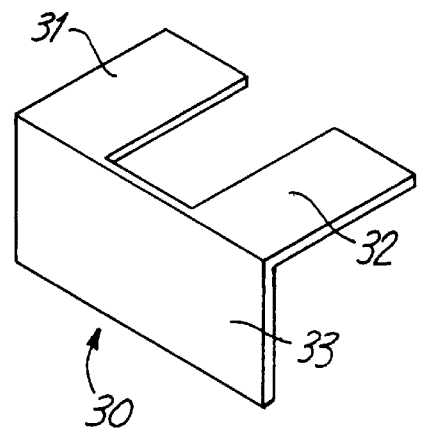
FIG. 5 shows an alternate embodiment of the invention.

FIG. 5 shows an alternate embodiment that uses a first member 33 with a pair of legs 31 and 32 that extend outward to form a shield over the electrical leads.

While the preferred embodiment shows the electrical insulating shield attached to the electrical switch by an adhesive; an adhesive need not be used. For example, if the material is made in a U-shape, the insulating material can be frictionally held in position over the electrical leads.

In order to facilitate removal from an electrical device such as a switch or receptacle, a tab can be located on the end of the member to aid in peeling the shield from an electrical device.

I claim:

1. An electrical insulation shield or safety shield for securing to an electrical device having a backside and a frontside with lateral sides connecting said frontside to said backside, said electrical insulation shield preventing an accidental shorting of the electrical device if the electrical device is removed or inserted into a junction box during a power on condition wherein the electrical device is located in the junction box with the electrical device having terminals on at least one of the lateral sides with the terminals normally proximate a side of the junction box with sufficient closeness so as to accidentally create a short between the side of the junction box and the electrical device if the electrical device is not pulled straight out of the junction box with the electrical shield comprising:

an electrically insulating material, said insulating material having a first region with an adhesive thereon to secure the first region to a portion of any of the sides except the frontside of said electrical device, said electrically insulating material having a second region with the second region of the electrical insulating material extending over an exposed electrical lead on one of the sides of the electrical device to prevent contact of the exposed electrical connection with the side of said junction box, said electrical insulating material second region shielding the exposed electrical leads on the electrical device from the junction box and a user to enable the electrical insulating material held over said exposed electrical leads and proximate said side of the junction box from making accidental contact between the electrical leads and the junction box as the electrical device is removed or replaced in the junction box.

2. The insulation shield of claim 1 wherein the safety shield has a "T" shape.

3. The insulation shield of claim 1 wherein the safety shield includes at least two adhesive sections for securing the safety shield to the electrical device.

4. The insulation shield of claim 1 wherein the safety shield is comprised of a transparent material.

5. The insulation shield of claim 1 wherein the safety shield first region is located at a right angle to the second region of the safety shield with the second region secured to the backside of the electrical device and the second region located at a right angle to the first region.

6. The insulation shield of claim 1 wherein the electrical device is an electrical switch and the portion of the insulation shield extending over the side terminals is flat.

7. The insulation shield of claim 1 wherein the safety shield includes two oppositely disposed edges with an adhesive located proximate to each of said oppositely disposed edges to hold said safety shield on the electrical device.

* * * * *